Nov. 29, 1966 G. A. HEALIS 3,289,068

BUS ARRANGEMENT FOR SEMICONDUCTOR RECTIFIERS

Filed May 2, 1963 3 Sheets-Sheet 1

INVENTOR.
GEORGE A. HEALIS

BY

OSTROLENK, FABER, GERB & SOFFEN

ATTORNEYS

BUS ARRANGEMENT FOR SEMICONDUCTOR RECTIFIERS

Filed May 2, 1963 3 Sheets-Sheet 2

INVENTOR.
GEORGE A. HEALIS
BY
OSTROLENK, FABER, GERB & SOFFEN
ATTORNEYS

BUS ARRANGEMENT FOR SEMICONDUCTOR RECTIFIERS

INVENTOR.
GEORGE A. HEALIS

BY

OSTROLENK, FABER, GERB & SOFFEN

ATTORNEYS

United States Patent Office 3,289,068
Patented Nov. 29, 1966

3,289,068
BUS ARRANGEMENT FOR SEMICONDUCTOR RECTIFIERS

George A. Healis, Lansdowne, Pa., assignor to I-T-E Circuit Breaker Company, Philadelphia, Pa., a corporation of Pennsylvania Filed May 2, 1963, Ser. No. 277,559
6 Claims. (Cl. 321—8)

My invention relates to a novel bus arrangement for semiconductor rectifiers, and more specifically relates to a novel arrangement wherein main extruded buses which may carry coolant conduits directly receive the semiconductor rectifier elements of a rectifier unit.

A typical prior art bus arrangement for semiconductor rectifiers is shown in my U.S. Patent No. 2,945,961 entitled "Current Balancing Reactors for Diodes," and assigned to the assignee of the present invention. Thus, where a plurality of rectifier elements is to be provided in, for example, a bridge connection, separate bus elements are provided for receiving the rectifier elements of each of the arms of the bridge, and these separate bus elements are then secured to a main bus member. Each of the separate bus elements is then further provided with respective cooling channels.

The principle of the present invention is to utilize the main bus structure as the member for receiving the various rectifier elements with the main bus structure carrying a simplified cooling arrangement. Where a large number of rectifier elements are to be provided, the main bus members are preferably larger area members, and to this end I have provided a novel extruded arrangement for the bus wherein a plurality of longitudinally extruded sections are dovetailed together.

Accordingly, the primary object of this invention is to provide a bus arrangement for semiconductor rectifiers which saves space and material.

Another object of this invention is to provide a novel bus arrangement for semiconductor rectifiers which saves a large number of pipe connections for cooling conduits.

Still another object of this invention is to provide a novel bus arrangement for rectifiers which is inexpensive.

Another object of this invention is to provide a large area positive and negative bus bar closely spaced to one another to obtain low reactance.

A further object of this invention is to provide a novel bus structure for rectifiers which has a large area formed by the dovetailing of a plurality of lonigtudinally extruded bus members.

These and other objects of this invention will become apparent from the following description when taken in connection with the drawings, in which:

FIGURE 1 schematically illustrates a circuit diagram of a rectifier of the type to which the invention applies.

FIGURE 2 schematically illustrates a prior art manner in which the rectifiers of one arm of the bridge of FIGURE 1 are mechanically connected to their respective bus conductor.

FIGURE 3 schematically illustrates in perspective view the novel bus arrangement of the invention.

Figures 1, 2:
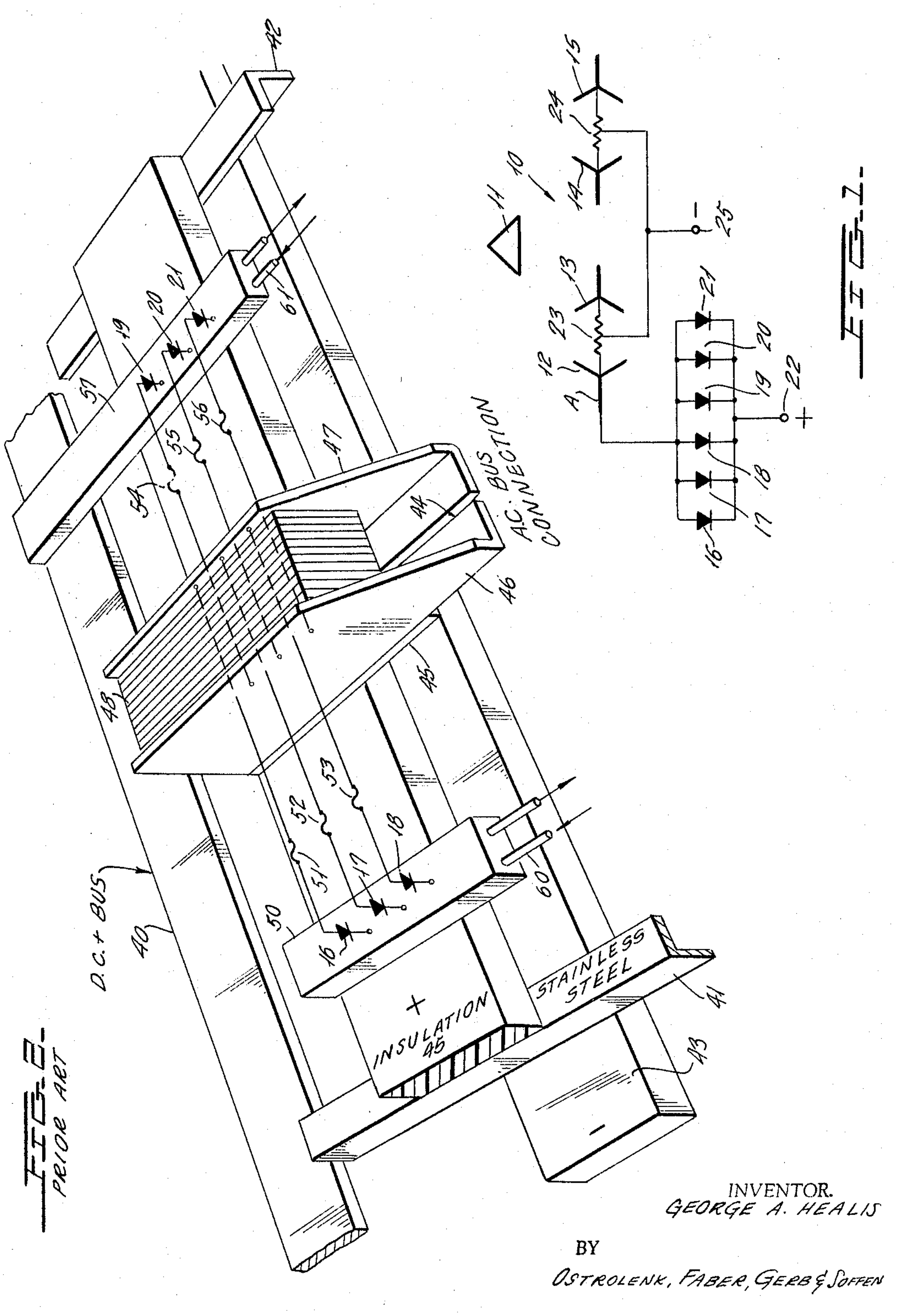

Referring first to FIGURE 1, I have illustrated therein a typical rectifier connection wherein a main power transformer 10 having a primary winding 11 and secondary windings 12, 13, 14 and 15 serves as the rectifier transformer. Each of the phases of each of the secondary windings 12 through 15 are then connected to appropriate semiconductor rectifiers as illustrated for example, for phase A of winding 12, wherein six rectifiers 16 through 21 are connected in parallel with one another and in series with phase A to terminate at a positive terminal 22. Interphase transformers 23 and 24 then connect the neutrals of windings 12–13 and 14–15 respectively with a center tap on the interphase transformers 23 and 24 being brought out to form a negative terminal 25. Clearly, each of the other phases of windings 12 through 15 will be connected to an appropriate set of rectifier elements similar to elements 16 through 21, each of which terminates at the common positive terminal 22.

The number of rectifiers connected in parallel is determined by the current rating of the particular unit. Moreover, it will be apparent to those skilled in the art that a plurality of rectifier elements may be connected in series to reach a desired voltage output rating.

In order to balance the current flow between the various parallel connected rectifier elements such as rectifier elements 16 through 21, appropriate current balancing means may be provided, as illustrated in my above noted U.S. Patent No. 2,945,961 and as will be shown more fully later.

In the past, the rectifier elements of each of the arms of the circuit of FIGURE 1 have been connected to their own respective bus elements. By way of example, FIGURE 2 schematically illustrates the prior art arrangement wherein a positive bus 40 (corresponding to the positive output terminal 22 of FIGURE 1) is supported by an appropriate insulation member 45 which is in turn supported from steel frames 41 and 42. Negative bus 43 which corresponds to negative output terminal 25 of FIGURE 1 is also appropriately supported and is displaced from bus 40. The input A.-C. bus 44 which is supported from insulation member 45 is then connected to phase A of FIGURE 1, and is formed of generally L-shaped conductors 46 and 47 which receive an appropriate set of current balancing reactor laminations 48 between them in the manner illustrated in my above noted U.S. patent.

Three of the rectifier elements such as rectifier elements 16, 17 and 18 of FIGURE 1 are then secured to a separate bus element 50 which is, in turn, mechanically and electrically connected to positive bus 40. Each of the elements may respectively be connected in series with fuses 51, 52 and 53, and then passed through conductor 46 and current balancing laminations 48 in insulated relationship therewith to terminate on conductor 47. Thus, current flow from the A.-C. bus 44 to rectifier elements 16, 17 and 18 necessarily passes through current balancing laminations 48.

The other three rectifier elements 19, 20 and 21 are connected in series with respective fuses 54, 55 and 56 and terminate on the second bus element 57. The other end of each of the rectifier elements passes through the above noted fuses and passes through conductor 47 and current balancing reactor laminations 48 to terminate on conductor 46. Thus, all current from the input A.-C. phase conductor 44 necessarily passes through current balancing reactor laminations 48. The bus element 57 is, of course, directly secured to bus 40 whereby the circuit illustrated in FIGURE 1 is formed.

In order to provide appropriate cooling for the respective elements 16 through 21 which are in intimate contact with their bus elements 50 and 57, cooling conduits such as conduits 60 and 61 circulate through bus elements 50 and 57 respectively, whereby cooling fluid may be passed through the conduits, as illustrated by the arrows in FIGURE 2 to cool the bus elements 50 and 57 and, thus, the rectifier elements 16 through 18 and 19 through 21 respectively.

In order to form the complete circuit of FIGURE 1, it will be seen that twelve systems of the type shown in FIGURE 2 must be secured to bus 40. Thus, there is considerable labor and material expense involved.

Figure 3:
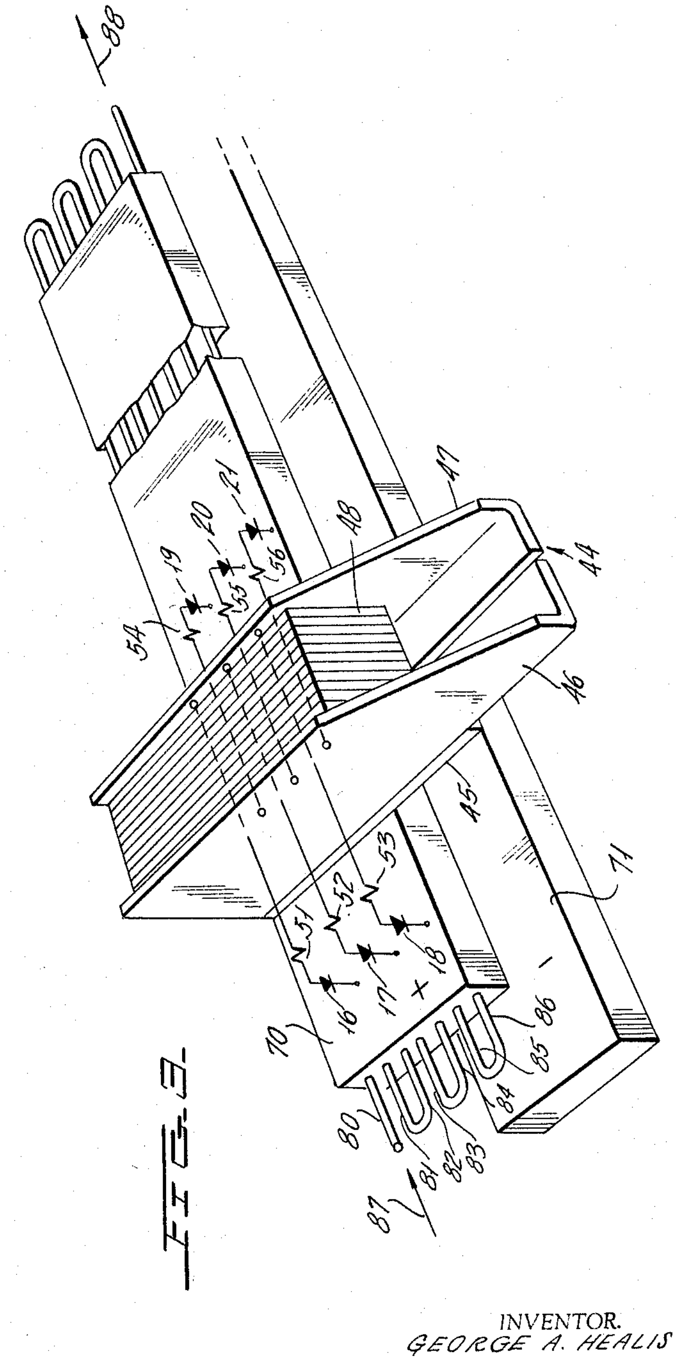

The principle of the present invention is illustrated in FIGURE 3 for the bridge arm shown in FIGURES 1 and 2. More specifically, and in accordance with the invention, the arrangement of FIGURE 3 terminates the rectifier elements directly on the main bus.

Referring now to FIGURE 3, the main positive bus corresponding to terminal 22 of FIGURE 1 is formed by the bus 70 which is appropriately supported with respect to the negative bus 71 which corresponds to negative output terminal 25 of FIGURE 1. The input A.-C. bus corresponding to phase A of FIGURE 1 is formed in a manner identical to that of FIGURE 2, wherein the bus 44 formed of sections 46 and 47 is supported in insulated relationship with respect to bus 70 by an appropriate insulation spacer 45. However, the rectifier elements 16, 17 and 18 terminate directly on bus 70 and, in a similar manner, rectifier elements 19 through 21 terminate directly on the positive bus 70. The completion of the rectifier element circuit is similar to that of FIGURE 2, however, with rectifier elements 16, 17 and 18 being connected to conductor 47 through the current balancing reactor laminations 48 and rectifier elements 19 through 21 being connected to conductor 46 through the laminations 48.

Note in FIGURE 3 that separate bus elements for receiving the various rectifier elements are eliminated. This is achieved by using a bus structure for bus 70 which has a sufficiently wide surface area to receive all of the diodes being used.

While only two groups of three rectifier elements are shown as terminating on the bus of FIGURE 3, it will be understood by those skilled in the art that the number of rectifier elements may be of the order of ten or twenty rectifier elements, thus necessitating a large bus width.

As an important advantage of the novel structure of the invention, it now becomes possible to use a single cooling system for all of the rectifier elements connected to bus 70. That is to say, FIGURE 3 illustrates only the rectifier elements associated with phase A of winding 12. The bus 70, however, will support 11 additional similar structures along its length. Alternatively, two positive buses may be provided, each having 6 groups of rectifiers along their length. Thus, a single or common cooling conduit system illustrated in FIGURE 3 by the series connected conduits 80, 81, 82, 83, 84, 85 and 86 can circulate a coolant throughout the length of bus 70 with a single input at arrow 87 and a single output at arrow 88, or any other desired arrangement of series parallel systems for the conduit.

Figure 6:
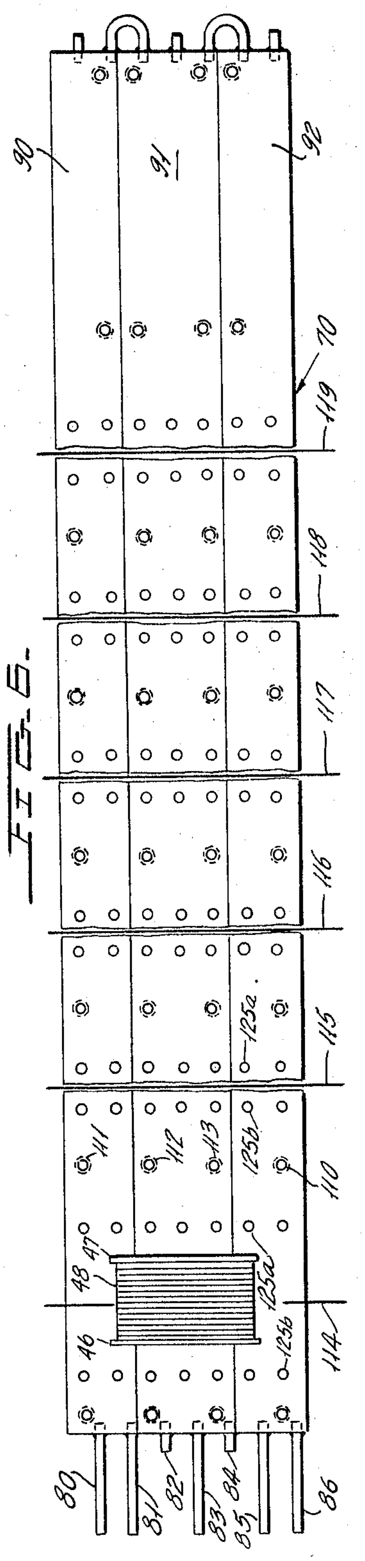
FIGURE 6 is a top plan view of the bus of FIGURE 5.
Figures 4, 5:
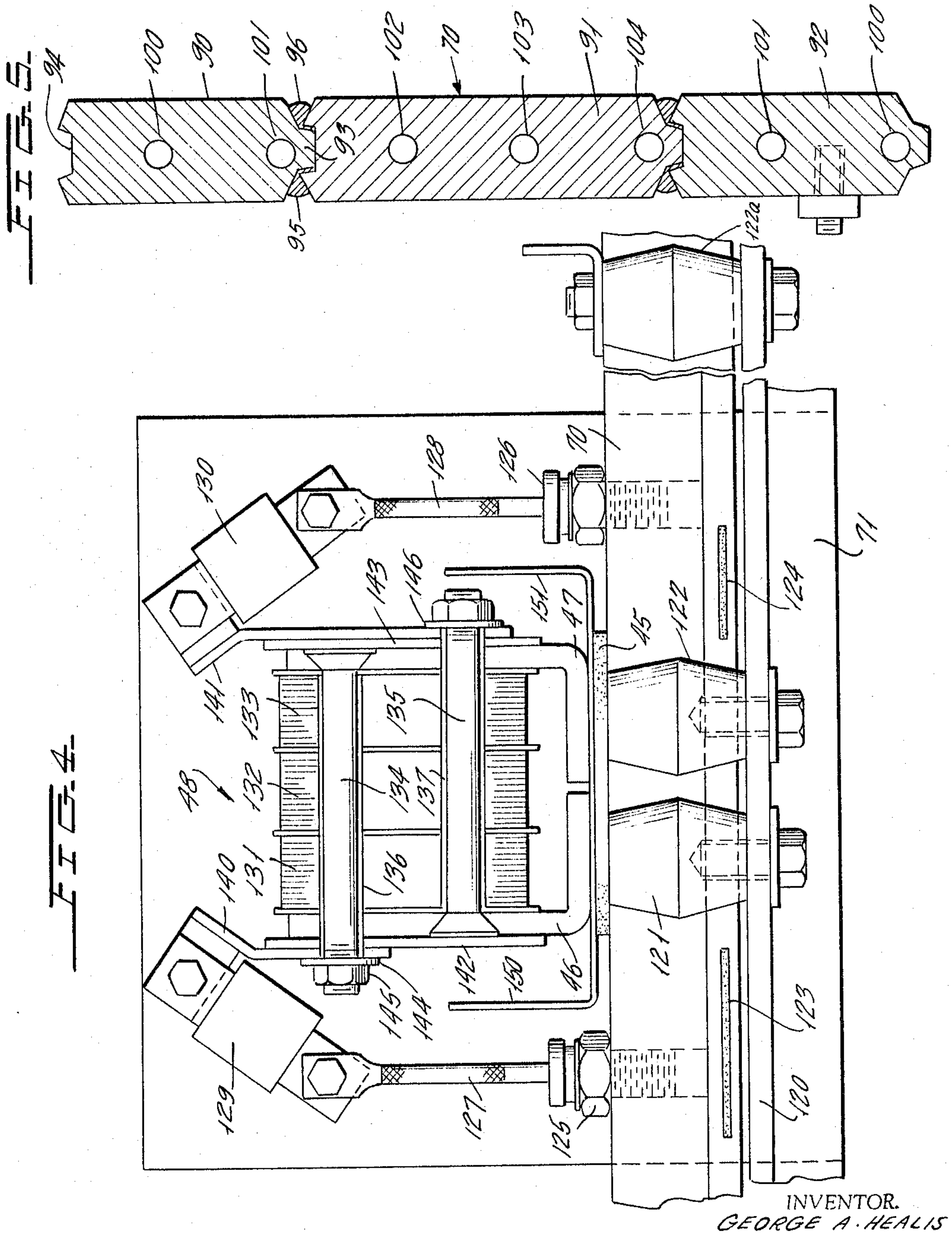
FIGURE 4 is a section view which illustrates the manner in which rectifier elements of FIGURE 3 are secured to the novel bus arrangement along with the arrangement of the current balancing reactors.
FIGURE 5 is a side cross-sectional view of the novel extruded bus of the invention.

In order to form the wide area bus of FIGURE 3, the bus is preferably formed in the manner shown in FIGURES 5 and 6. Referring now to these figures, I have shown the bus 70 as being formed of three extruded sections 90, 91 and 92. Each of these buses are extruded with their sides having a tongue and groove arrangement such as tongue 93 and groove 94 for bus 90, wherein the bus sections may be laterally joined in a tongue and groove manner, and thereafter welded as by the welding beads 95 and 96 which join sections 90 and 91. During the extrusion process, bus sections 90 and 92 have fluid carrying conduits 100 and 101 formed therein, while section 91 has conduits 102, 103 and 104 therein. Thus, the completed bus has seven passages therein for receiving the conduit connections shown in FIGURE 3.

It will be noted that the novel bus arrangement of FIGURES 5 and 6 permits the formation of any desired bus width which is determined by the number of rectifier elements which are to be connected in parallel in each arm of the rectifier circuit. Thus, where a smaller number of rectifier elements are needed, the bus could be formed simply of sections 91 and 92. Where a larger number of rectifier elements are to be received, an additional section could be added to the structure of FIGURE 5 having the configuration of bus element 90 secured, for example, in groove 94 of element 90. Therefore, considerable savings in inventory can be effected, since two or, if desired, one strip form need be stocked which can be used for any large number of installations. In general, and by a "wide" bus, I refer to a bus which has a width to thickness ratio of the order of five to one, or greater.

As seen in FIGURE 6, the bus elements are provided with appropriate openings such as openings 110, 111, 112 and 113 for mounting bolts along the length of the bus to receive the iron supporting portions of the A.-C. terminals. Thus, in FIGURE 6, which is arranged for the circuit of FIGURE 1, bus 44 of FIGURE 3 could be centered on line 114. The connection for the other two phases of winding 12 would be centered on lines 115 and 116. The three phases of winding 13 can then terminate on lines 117, 118 and 119.

A second positive bus arrangement (not shown) identical to that of FIGURES 5 and 6 may then receive the input connections of secondary windings 14 and 15 and their respective rectifier elements, should this be preferred to a single positive bus with the two separate positive buses being connected together in an appropriate manner.

The manner in which the rectifier elements and current balancing reactor members are secured to the positive bus is illustrated in more detail in FIGURE 4. Referring now to FIGURE 4, I have illustrated therein a main structural support 120 which carries insulation spaces 121, 122 and **122*a* which are secured in an appropriate manner illustrated by spacer 122*a* to the positive bus 70 to support bus 70 with respect to structural member 120 and the negative bus 71. The negative bus 71 is also provided with appropriate support means (not shown) extending from main support 120. An insulation spacer partially shown at sections 123 and 124 extends between the opposing surfaces of buses 70 and 71** to insure good electrical insulation between these members.

Rectifier elements 125 and 126 (which could correspond to rectifier elements 18 and 21 of FIGURE 3) may be provided with threaded studs which are threaded directly into appropriate threaded openings in the bus 70. By way of example, the cross-marks such as cross-marks **125*a* and 125*b* in FIGURE 6 at location 114** indicate the centers of threaded openings which have been preformed into the novel bus structure. Note that in FIGURE 6, seven such threaded openings are provided for the reception of seven rectifier elements across the full width of the bus.

Each of rectifier elements 125 and 126 have extending pigtails 127 and 128 which terminate at one terminal of fuses 129 and 130 respectively. The input A.-C. bus, as illustrated in FIGURE 3, is formed of the L-shaped conductors 46 and 47, and this arrangement is repeated in FIGURE 4 for the reception of the current balancing reactor laminations 48.

As seen in FIGURE 4, the current balancing reactor laminations are formed in three separate packages 131, 132 and 133, and have openings therethrough for receiving conductive studs 134 and 135 which are appropriately insulated from the lamination stack 48 by insulation tubing 136 and 137. It will be noted that tubing 136 extends into conductor 46 so that stud 134 is insulated from conductor 46, while tubing 137 extends into conductor 47 so that stud 135 is insulated from conductor 47.

The upper ends of fuses 129 and 130 are then connected to conductive straps 140 and 141 respectively which lie over insulation spacers 142 and 143 respectively. Strap 140 is then connected to the left-hand end of stud 134 through the conductive washer 144 which is beneath the nut 145. In a similar manner, strap 141 is connected to the right-hand end of stud 135 through the conductive washer 146. Accordingly, a current path is established for rectifier element 125 which extends from bus 70 through fuse 129, strap 140, stud 134 and terminates on conductor 47, whereby the current flow through rectifier element 125 necessarily passes through the current balancing reactor laminations 48. In a similar manner, current flow through rectifier element 126 necessarily passes through stud 135 to terminate on conductor 46 whereby the electrical path includes the current balancing reactor laminations 48. This forces current flow in opposite direction for balancing.

It will be observed that FIGURE 4 further shows the insulation spacer 45 of FIGURE 3 as positioned between conductive members 46 and 47 and bus 70. FIGURE 4 additionally shows L-shaped insulation members 150 and 151 which serve to decrease the possibility of flashover from lower portions of conductors 46 and 47 to the rectifier elements on either side of conductors 46 and 47.

Clearly the negative bus 71 can be formed in the manner illustrated in FIGURE 5 to have cooling conduits extruded directly in connectible longitudinal sections.

As an important advantage of the invention, it is seen in FIGURES 3 and 4 that the positive and negative buses 70 and 71 respectively may be immediately adjacent one another as contrasted to the off-set spacing required as illustrated in FIGURE 2. This arrangement substantially reduces leakage reactance and permits improved rectifier performance.

Although I have described preferred embodiments of my novel invention, many variations and modifications will now be apparent to those skilled in the art, and I prefer therefore to be limited not by the specific disclosure herein but only by the appended claims.

The embodiments of the invention in which an exclusive privilege or property is claimed are defined as follows:

1. A bus structure for a multiphase power converter; said bus structure including a longitudinally extending bus member; said multiphase power converter including a multiphase transformer and a plurality of rectifier elements connected to each phase of said multiphase power transformer; said plurality of rectifier elements connected to said longitudinally extending bus member in separated groups at longitudinally spaced locations along said bus member and being in mechanical and electrical engagement with respect to said bus member; the terminals of said multiphase transformer for said respective groups of rectifier elements being mechanically supported from said elongated bus and being located between its respective first and second groups of rectifier elements.

2. The bus structure of claim 1 wherein each of said groups of rectifier elements are respectively aligned along a line transverse to the longitudinal axis of said bus.

3. A bus structure for a multiphase power converter; said bus structure including a longitudinally extending bus member; said multiphase power converter including a multiphase transformer and a plurality of rectifier elements connected to each phase of said multiphase power transformer; said plurality of rectifier elements connected to said longitudinally extending bus member in separated groups at longitudinally spaced locations along said bus member and being in mechanical and electrical engagement with respect to said bus member; said elongated bus having fluid conducting conduits therein for cooling each of said pluralities of rectifier elements; said elongated bus formed of a plurality of longitudinally elongated bus members connected to one another along their lateral sides to form a large width bus; each of said bus members having a cooling conduit extending therethrough.

4. The bus structure of claim 3 wherein the two lateral sides of said bus members have a tongue and groove respectively; the tongues of said bus members engaging the grooves of adjacent bus members.

5. The device as set forth in claim 3 which includes a second longitudinally extending bus member of opposite polarity to said extending bus member; said extending bus member and said second extending bus member having large areas and being positioned adjacent one another.

6. The bus structure of claim 5 wherein each of said bus members have cooling conduits extending therethrough.

References Cited by the Examiner

UNITED STATES PATENTS

| | | | |
|---|---|---|---|
| 2,942,165 | 6/1960 | Jackson et al. | |
| 3,068,391 | 12/1962 | Kliesch | 321—8 |

FOREIGN PATENTS

| | | |
|---|---|---|
| 565,471 | 3/1958 | Belgium. |

JOHN F. COUCH, *Primary Examiner.*

W. H. BEHA, *Assistant Examiner.*